(12) United States Patent
Ganti et al.

(10) Patent No.: US 11,138,520 B2
(45) Date of Patent: Oct. 5, 2021

(54) RANKING AND UPDATING MACHINE LEARNING MODELS BASED ON DATA INPUTS AT EDGE NODES

(71) Applicant: International Business Machines Corporation, Armonk, NY (US)

(72) Inventors: Raghu Kiran Ganti, Elmsford, NY (US); Mudhakar Srivatsa, White Plains, NY (US); Swati Rallapalli, Ossining, NY (US); Shreeranjani Srirangamsridharan, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 736 days.

(21) Appl. No.: 16/021,086

(22) Filed: Jun. 28, 2018

(65) Prior Publication Data

US 2020/0005191 A1 Jan. 2, 2020

(51) Int. Cl.
*G06N 20/00* (2019.01)
*H04L 29/08* (2006.01)

(52) U.S. Cl.
CPC .............. *G06N 20/00* (2019.01); *H04L 67/10* (2013.01); *H04L 67/12* (2013.01)

(58) Field of Classification Search
CPC . G06N 3/08; G06N 20/00; G06N 5/04; G06F 17/18; G06K 9/627; G06K 9/6277
See application file for complete search history.

(56) References Cited

U.S. PATENT DOCUMENTS

| | | | |
|---|---|---|---|
| 8,311,967 B1* | 11/2012 | Lin | G06N 20/00 706/45 |
| 2015/0169633 A1 | 6/2015 | Yee et al. | |
| 2015/0254555 A1 | 9/2015 | Williams, Jr. et al. | |
| 2016/0307113 A1 | 10/2016 | Calapodescu et al. | |
| 2018/0246985 A1* | 8/2018 | Sclaroff | G06F 7/00 |
| 2018/0314975 A1* | 11/2018 | Zang | G06N 20/00 |

OTHER PUBLICATIONS

Tim Kraska et al.; The Case for Learned Index Structures; Dec. 11, 2017; arxiv.org; https://arxiv.org/pdf, 27 Pages.

* cited by examiner

*Primary Examiner* — Eric J Yoon
(74) *Attorney, Agent, or Firm* — Cantor Colburn LLP; Joseph Petrokaitis

(57) ABSTRACT

An input dataset for training a new machine learning model is received by a processor. For each of a plurality of trained machine learning models, a hash function and a sketch of a training dataset used to train the machine learning model is retrieved. A sketch of the input dataset is computed based on the hash function and the input dataset, along with a distance between the sketch of the training dataset and the sketch of the input dataset. The computed distances of the trained machine learning models are ranked from smallest to largest, and a seed machine learning model for the input dataset is selected from the trained machine learning models based at least in part on the ranking. A training process of the new machine learning model using the selected seed machine learning model and the input dataset is initiated.

20 Claims, 6 Drawing Sheets

RANKING AND UPDATING MACHINE LEARNING MODELS BASED ON DATA INPUTS AT EDGE NODES

STATEMENT REGARDING FEDERALLY SPONSORED RESEARCH OR DEVELOPMENT

This invention was made with Government support under W911NF-16-3-0001 awarded by Army Research Office (AR). The Government has certain rights in this invention.

BACKGROUND

The present invention generally relates to computer systems and, more specifically, to systems and approaches for ranking and updating machine learning models based on data inputs at edge nodes in a distributed computer system.

Machine learning is a subset of artificial intelligence that often uses statistical techniques to give computers the ability to learn, or progressively improve performance on a specific task over time in an autonomous fashion by feeding the computers data and information in the form of observations and real-world interactions. Machine learning models can be built from data collected at edge nodes of a distributed computer system to enable the detection, classification, and prediction of current and future events. Deep learning is part of a broader family of machine learning methods based on learning data representations, as opposed to task-specific algorithms. Deep learning models require large labeled training datasets.

Often, the first step in training a machine learning model that is a deep learning model is to identify a seed model (e.g., a previously trained machine learning model) which can be re-trained to better fit the new input dataset and/or the application. Contemporary approaches to identifying such a seed model include a trial-and-error approach that is both cumbersome and manual, and may not result in selecting a seed model that requires a minimum amount of training when compared to other potential seed models.

A common paradigm for machine learning is one where machine learning models are trained in the cloud (e.g., on a cloud node) and the trained machine learning models are applied, or used to score real-time data, at the edge nodes of a distributed computer system. A key drawback to this approach is the inability to track changes in input that are seen at the edge node(s) where the trained model is being applied and thus, this approach fails to support continual learning and updates to the previously trained machine learning model.

Accordingly, while machine learning techniques are suitable for their intended purposes, what is needed is a system or method having certain features of embodiments of the present invention.

SUMMARY

According to one or more embodiments of the present invention, computer-implemented methods for ranking and updating machine learning models based on data inputs at edge nodes in a distributed computer system are provided. A non-limiting example computer-implemented method includes receiving, by a processor, an input dataset for training a new machine learning model. For each of a plurality of trained machine learning models, a hash function and a sketch of a training dataset used to train the machine learning model are retrieved. A sketch of the input dataset is computed based on the hash function and the input dataset, along with a distance a distance between the sketch of the training dataset and the sketch of the input dataset. The plurality of trained machine learning models are ranked from smallest computed distance to largest computed distance. A seed machine learning model is selected from the plurality of trained machine learning models based at least in part on the ranking. A training process of the new machine learning model is initiated based at least in part on the selecting. The training process is based at least in part on the selected seed machine learning model and the input dataset.

In addition to one or more of the features described above or below, or as an alternative, further embodiments of the computer-implemented method may include that a trained machine learning model ranked as having a smallest computed distance is selected as the seed machine learning model. Technical benefits and advantages of using as seed model may include less central processing unit (CPU) resources required to train a new machine learning model. Additional technical benefits and advantages of using the seed model may include less storage capacity required, and less network/bus bandwidth required due to a smaller amount of training data required to generate the new machine learning model.

In addition to one or more of the features described above or below, or as an alternative, further embodiments of the computer-implemented method may include the performing, ranking, selecting and initiating are performed automatically by the node in response to the receiving. Technical benefits and advantages can include not requiring user input to generate the new machine learning model. This can result in both CPU and network resource savings.

In addition to one or more of the features described above or below, or as an alternative, further embodiments of the computer-implemented method may include initiating re-training of the selected seed machine learning model, the re-training based at least in part on a training dataset used to train the selected seed machine learning model and the input dataset. Technical benefits and advantages can include keeping the machine learning model current and continuously adapting over time.

In addition to one or more of the features described above or below, or as an alternative, further embodiments of the computer-implemented method may include the re-training being initiated based at least in part on the distance between the sketch of the training dataset and the sketch of the input dataset being less than a threshold. Technical benefits and advantages can include keeping the machine learning model current and continuously adapting over time.

Other embodiments of the present invention implement the features of the above-described methods in computer systems and in computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
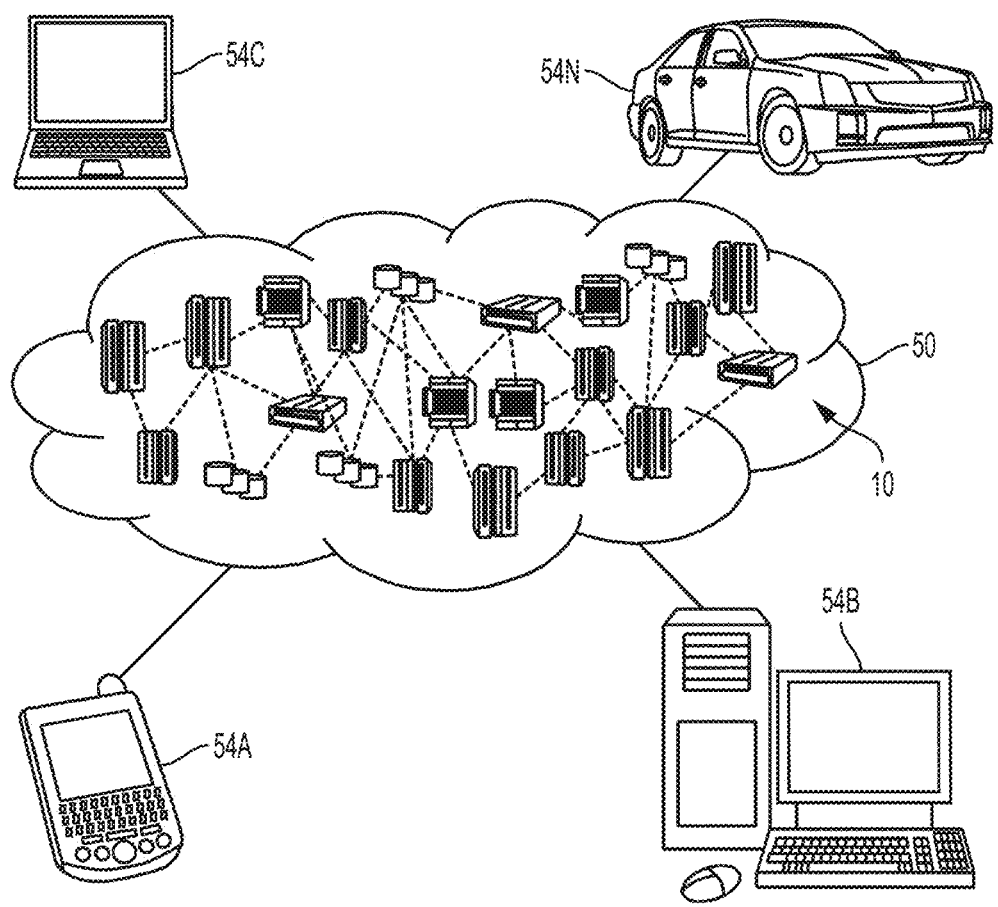
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
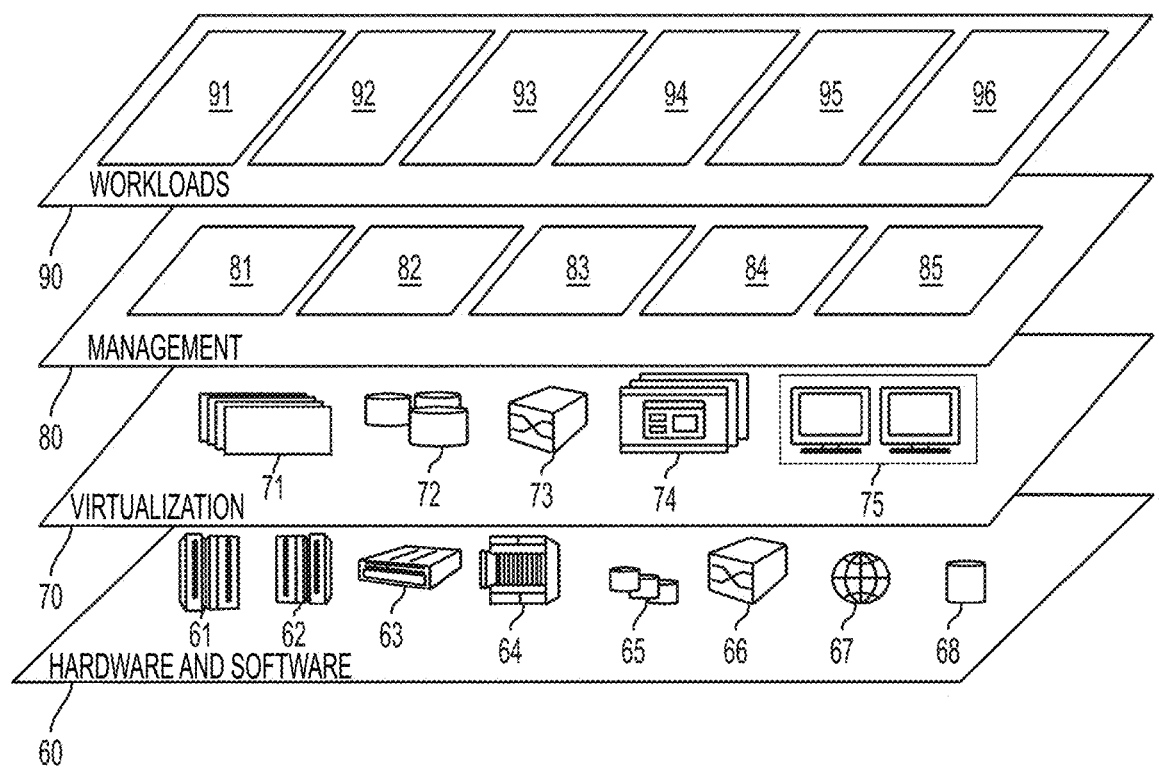
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and ranking and updating machine learning models based on data inputs at edge nodes in a distributed computer system 96.

Figure 3:
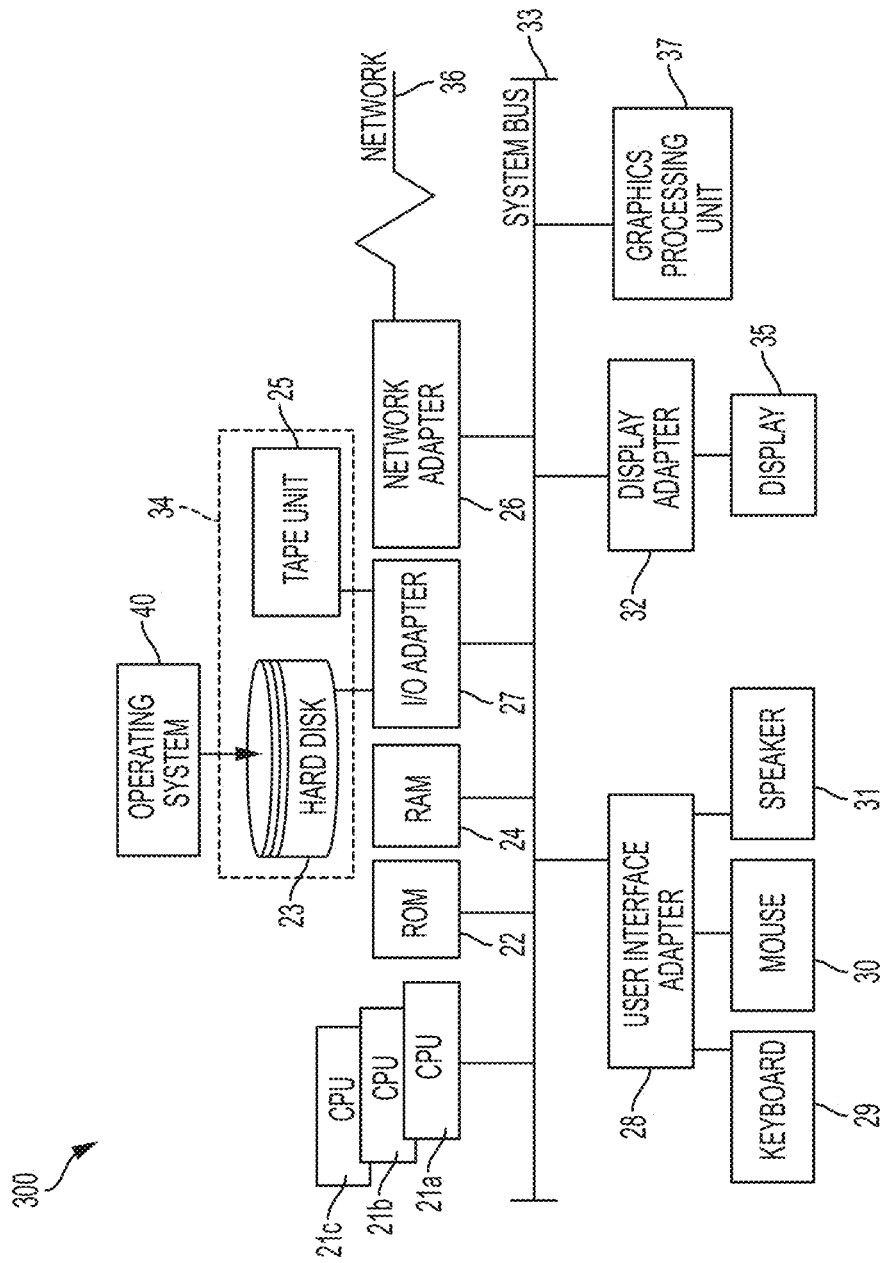
FIG. 3 depicts a processing system for implementing one or more embodiments of the present invention.

It is understood that one or more embodiments of the present invention are capable of being implemented in conjunction with any other type of computing environment now known or later developed. For example, FIG. 3 depicts a block diagram of a processing system 300 for implementing the techniques described herein. The processing system 300 is an example of a computing node 10 of FIG. 1. In the embodiment shown in FIG. 3, processing system 300 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 300.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 300 can be stored in mass storage 34. The RAM 22, ROM 24, and mass storage 34 are examples of memory 19 of the processing system 300. A network adapter 26 interconnects system bus 33 with an outside network 36 enabling the processing system 300 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 300 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 300 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 300.

Turning now to an overview of the aspects of the invention, one or more embodiments of the present invention address the above-described shortcomings of the prior art by providing a computer-implemented method and system to search and rank a catalog of pre-trained machine learning models to select a trained machine learning model to be used as a seed model for customizing and re-training based on a new input dataset. The seed model is selected based on a similarity between the training data used to generate the seed model and the data in the new input dataset. One or more embodiments of the present invention provide a "web search engine" for machine learning models, where a catalog of trained machine learning models can be searched and ranked based on a given "search" dataset from the target application. This automated approach to selecting a trained machine learning model that best matches the new input dataset eliminates the trail-and-error approach of contemporary solutions.

In accordance with one or more embodiments of the present invention, each trained machine learning model (M) that is a candidate seed model is stored along with its corresponding deep hash code generator (H) and semantic label (S). The hash code generator (H), maps the input data to a n-dimensional real-valued vector. The hash code generator (H) is trained on the same dataset that is used to train the machine learning model (M). Unlike the machine learning model (M) whose intent is to capture application semantics (e.g., object localization), the goal of the hash code generator (H) is to capture the characteristics of the training data used to train the machine learning model (M). Semantic label (S) is a compact sketch over the hash codes derived from the training data (e.g., via unsupervised clustering). As used herein, the terms "sketch over the hash codes" refers to creating a compact representation (e.g., a cluster head; a function capturing the hash codes) of the hash codes so that all the hash codes are not stored.

In accordance with one or more embodiments of the present invention, a protocol is provided between a user (e.g., at an edge node) and a cloud hosted catalog of machine learning models that allow the user to search using a given input dataset. Search results returned include a list of machine learning models in the catalog that are ranked based on a semantic distance measure between the search dataset and the training dataset used to train the machine learning model (M). In accordance with one or more embodiments of the present invention, the machine learning model having the highest rank (e.g., lowest distance) is selected as the seed model for training based on the input dataset. In other embodiments of the present invention, a machine learning model ranked within the top two or three or some other threshold number is selected as the seed model.

A key component in training machine learning models, especially deep learning models is to have a good initialization/starting point. The weights chosen at initialization time decide the speed with which the model learning converges and its accuracy as well. Thus, starting with a good set of weights is important. A ranked list of models provides the developer with a choice of several models that are stack ranked according to the applicability to the current context (based on the input data). The developer can then choose the best fitting model to the problem at hand, enabling the convergence to be faster and the accuracy improvement as well. The benefits and applications of such a ranking mechanism is significant improvement in the training phase. Further, the ranked list also can enable checking which models are applicable (if at all).

Figure 4:
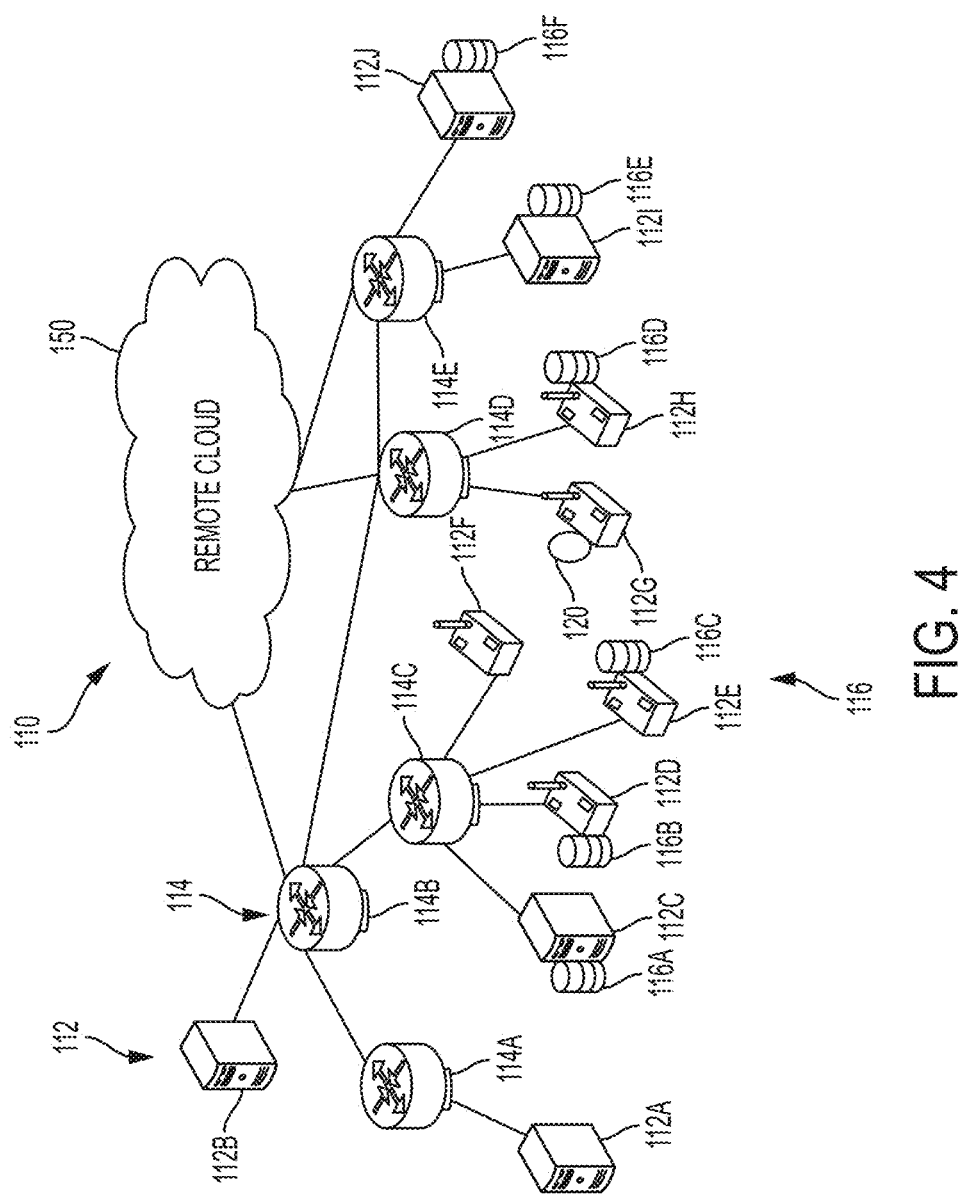
FIG. 4 depicts a block diagram of a system according to one or more embodiments of the present invention.

Turning now to a more detailed description of aspects of the present invention, FIG. 4 depicts a block diagram of a distributed computer system 110 for ranking and updating machine learning models based on data inputs at edge nodes 112 according to one or more embodiments of the present invention. The distributed computer system 110 can include a plurality of network elements 114 (e.g., network elements 114A-114E) operable to enable communication between the edge nodes 112 (e.g., edge nodes 112A-112J) and a remote cloud 150, where the remote cloud 150 can include cloud nodes and be a portion of a cloud computing environment (e.g., the cloud computing environment 50 of FIG. 1). The edge nodes 112 may include one or more of: a sensor, a gateway, a micro-server, a wireless communication access node, or any other type of entity having computation and networking capabilities, such as the processing system 300 of FIG. 3. The network elements 114 can include routers, switches, gateways, and other such elements to support communication known in the art. The edge nodes 112 can have local data stores 116 (e.g., local data storage 116A-116F) that may hold local datasets to support training and performance of machine learning.

In the example of FIG. 4, edge node 112A is communicatively coupled to network element 114A which in turn is communicatively coupled to edge node 112B, network element 114C, network element 114D, and remote cloud 150. Network element 114C is communicatively coupled to edge nodes 112C, 112D, 112E, 112F. Network element 114D is communicatively coupled to edge nodes 112G, 112H, network element 114E, and remote cloud 150. Network element 114E is communicatively coupled to edge nodes 112I, 112J, and remote cloud 150. Edge node 112C includes a local data store 116A; edge node 112D includes a local data store 116B; edge node 112E includes a local data store 116C; edge node 112H includes a local data store 116D; edge node 112I includes a local data store 116E; and, edge node 112J includes a local data store 116F. Although a specific configuration is depicted in the example of the distributed computer system 110 of FIG. 4, it will be understood that the distributed computer system 110 can include any combination of edge nodes 112 and network elements 114, and may exclude the remote cloud 150 or include additional elements (not depicted).

In accordance with embodiments of the invention, the distributed computer system 110 is configured and arranged to enable ranking of trained machine learning models to use as seed models and distributed machine learning, both based on data inputs to the machine learning models. The phrase "machine learning" broadly describes a function of electronic systems that learn from data. A machine learning system, engine, or module can include a machine learning algorithm that can be trained in a distributed environment, such as the distributed computer system 110, to learn functional relationships between inputs and outputs that are currently unknown. Examples of machine learning models can include, for instance, support vector machines, linear regression, K-means, and various neural networks.

Figure 5:
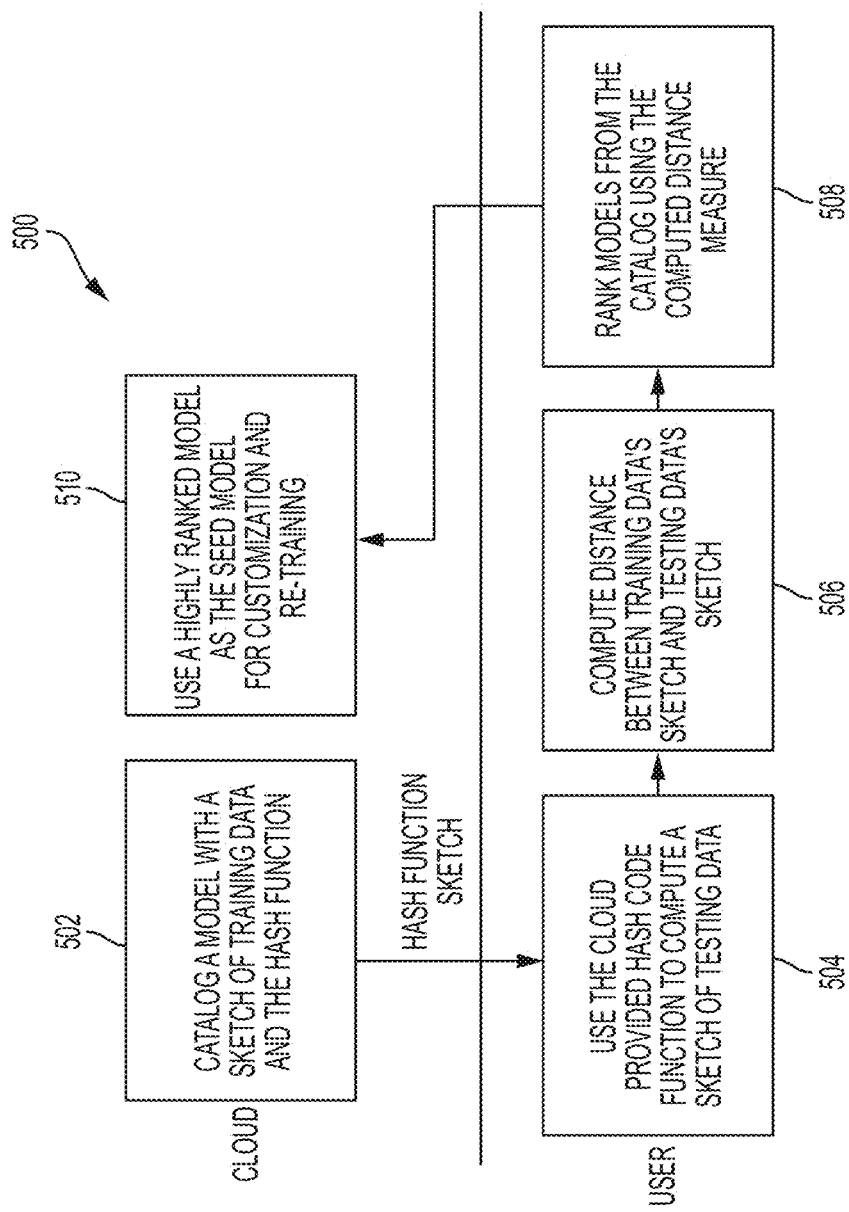
FIG. 5 depicts a flow diagram of a process for ranking machine learning models according to one more embodiments of the present invention.

Turning now to FIG. 5, a flow diagram 500 of a process for searching, indexing, and ranking machine learning models is generally shown according to one more embodiments of the present invention. All or a subset of the processing shown in FIG. 5 can be performed, for example, by an edge node(s) 112 and/or a cloud node(s) in the remote cloud 150 of FIG. 4. At block 502, a catalog of trained machine learning models is provided in the cloud. The catalog includes, along with each trained machine learning model, a sketch of the training data used to generate the trained machine learning model and the hash function applied to the training data to obtain the sketch.

Semantic hashing can reduce the dimensionality of high-dimensional data by inducing hash collisions on similar inputs. Early forms of semantic hashing (e.g., latent semantic indexing) have been successfully applied to text documents with the key idea being to learn a low dimensional representation of the word-count matrix via the use of singular value decomposition, resulting in compact vector representations, or hash codes, for each document. More recently, deep hash codes have been proposed to learn compact binary representations of images to discover hidden binary units in images. A collection of hash codes obtained from a training dataset can be summarized into a compact sketch (e.g., a semantic label) that captures the intrinsic properties of the training data.

Drawing an analogy to latent semantic indexing on text documents, the model (M) can be viewed as the text document and its semantic label (S) can be viewed as its index. From a semantic standpoint, deep hash codes determine in a quantitative way the extent to which a given data belongs to the model's training data distribution. From a performance standpoint, deep hash codes enable high compression of data space and fast lookups (faster than performing prediction using the corresponding model). From a privacy standpoint, deep hash codes enable queries that match hash codes instead of raw data, thereby offering a basic form of privacy via obfuscation.

Examples of existing hash code generators (H) that can be utilized by exemplary embodiments include, but are not limited to: unsupervised latent semantic hashing in the text domain; unsupervised autoencoder in the text and image domains; unsupervised Boltzmann machine in the text and image domain; supervised tailor feed-forward neural network in the text and image domain; unsupervised deep hashing in the image domain, supervised convolutional autoencoder in the image domain; supervised deep semantic ranking hash in the image domain; supervised deep neural network hashing in the image domain; unsupervised Word2Vec in the text domain; and/or unsupervised Node2Vec in the graph domain.

Referring back to block 502 of FIG. 5, in accordance with one or more embodiments of the present invention, a compact sketch of the training data for each trained machine learning model is computed. This can include applying the hash code generator to each of the training data values (x) to compute h(x) for each training data value. The resulting h(x) values can be clustered, using for example k-means++ clustering. A sketch $(c_i, w_i)$ can then be computed where $c_i$ is the $i^{th}$ cluster head and $w_i$ is the weighted silhouette coefficient (i.e., a cluster cohesiveness metric) for all the data that belongs to cluster "i". In accordance with one or more embodiments of the present invention, the sketch and hash code function (h) are stored in the catalog along with the trained machine learning model.

Blocks 504 and 506 of FIG. 5 are performed for at least a subset of the trained machine learning models in the catalog. Given unlabeled test data (also referred to herein as an "input dataset") one or more embodiments of the present invention automatically search and rank the catalog of machine learning models in terms of suitability for use as a seed mode. For a model (M) in the catalog, its deep hash code generator (H) is applied to the input dataset. A standard clustering cohesiveness measure (such as the Silhouette coefficient) is computed to determine how well the input dataset matches the training data (without requiring access to the training data). A variant of the standard Silhouette coefficient for a given test data can be computed as $(b-a)/b$, where a and b are the first and second closest distance (respectively) from the test data's hash code to the cluster centroids in the semantic label (S). This measure is guaranteed to be between 0 and 1 (since $b \geq a$); the closer it is to 1, the better is the match between the test data and the model's original training data. Silhouette coefficients averaged over all the test data serves as a similarity measure that which can be used to rank the models in the catalog (in decreasing order of similarity).

At block 504 of FIG. 5, the cloud provided hash code function (h) is applied to the input dataset. In accordance with one or more embodiments of the present invention, this includes computing h(x) for each input data value in the input dataset. The resulting h(x) values can be clustered as per the cluster heads in the sketch generated based at least in part on the training data. A sketch ($c_i$, $w_i$) of the input dataset can then be computed by obtaining the weighted silhouette, $w_i$, for each cluster. At block 506, a distance between the training data's sketch and the input dataset's sketch is computed. The distance can be calculated as the sum of $(w_i-w_{i'})^2$ over all i. At block 508, the trained machine learning models in the catalog are ranked using the distance computed at block 506. At block 510, a highly ranked trained machine learning model is selected as the seed machine learning model for customization and/or re-training.

The process shown in FIG. 5 shows a workflow where the training data of a machine learning model is never realized, or shown, to the user at an edge node (only its sketch is shared) and the input dataset is held private until a suitable seed model is discovered in the catalog. In another workflow performed by one or more embodiments of the present invention, block 502 is performed at a cloud node(s) in the cloud and the user (e.g., at an edge node) submits an input dataset as a search request to the cloud. Blocks 504, 506, and 508 are performed on the cloud (e.g., on one or more cloud nodes) and a list of ranked machine learning models are returned to the user at block 508. In another workflow performed by one or more embodiments of the present invention, the privacy of the training data and the input dataset is protected by performing block 502 on the cloud, and blocks 504 and 506 at an edge node accessed by the user so that testing data is not revealed to the cloud until a seed model is selected.

In accordance with one or more embodiments of the present invention, even if the objective of model M (e.g., object size estimation) is different from the application at hand (e.g., object orientation estimation), a highly ranked M can still serve as a candidate for transfer learning. For example, spatial features can be reused from the convolutional layers of M, while only re-training the regression layers (last few layers) to estimate the orientation of the object.

In accordance with one or more additional embodiments of the present invention, a protocol is provided between an edge node and a cloud (e.g., one or more cloud nodes) for distributed learning, where the trained machine learning mode (M) is initially trained in the cloud and includes a deep hash code generator (H) which inherently captures the characteristics of the training data used for training the trained machine learning model (M). At the edge node, the trained machine learning model (M) is not only used for scoring new input data, but it also continually tracks deviations in data characteristics of the new input data at the edge node compared to the training data. The deviations can be captured succinctly in the form of hash codes and communicated from the edge node to the cloud to facilitate model adaptation and re-training of the trained machine learning model (M). The ability to track changes in input data at edge nodes allows continual learning and updates to the trained model.

Edge nodes pose an interesting challenge to deep learning/machine learning model training. Edge nodes typically lack the resources that are available to the cloud. There are two key functions of the model ranking at the edge, one is to check if the models at the edge are applicable to the data being provided and two is to rank these models and pick the best model to retrain at the edge. The retraining is proceeded with once the model is deemed to be applicable. The retraining then happens by initializing the weights with the best possible model.

Figure 6:
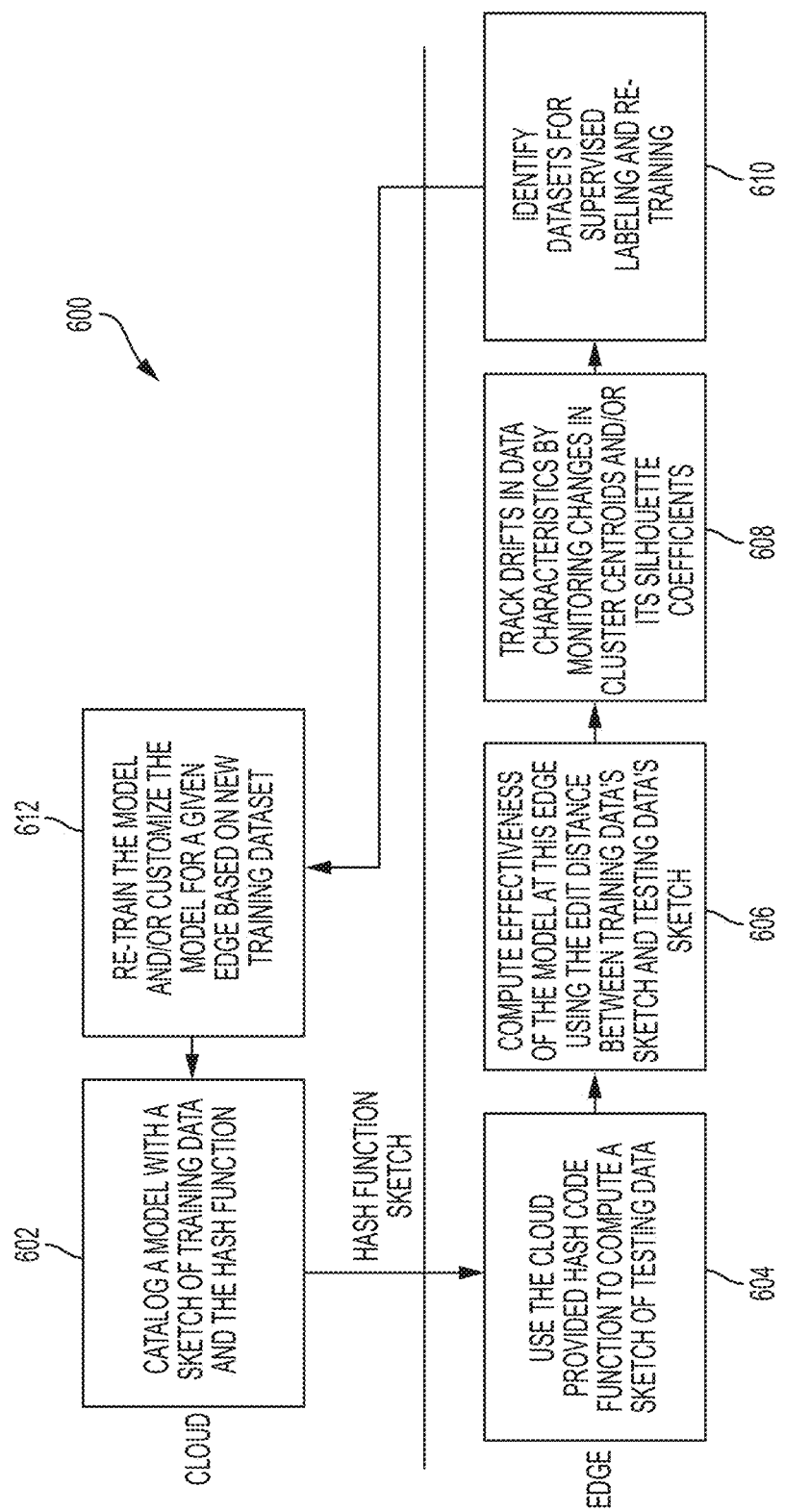
FIG. 6 depicts a flow diagram of a process for distributed learning at the edge according to one or more embodiments of the present invention.

Turning now to FIG. 6, a flow diagram 600 of a process for distributed learning at the edge is generally shown according to one or more embodiments of the present invention. All or a subset of the processing shown in FIG. 6 can be performed, for example, by an edge node(s) 112 and/or a cloud node(s) in the remote cloud 150 of FIG. 4. In accordance with one or more embodiments of the present invention, given a time series of unlabeled test data (e.g., daily/weekly/monthly batches) changes in the input data are automatically detected and characterized. At block 602 of FIG. 6, a compact sketch of training data used to generate a trained machine learning model is computed. This can include computing h(x) for each training data value (x). The resulting h(x) values can be clustered, using for example k-means++ clustering. A sketch ($c_i$, $w_i$) can then be computed where $c_i$ is the $i^{th}$ cluster head and $w_i$ is the weighted silhouette coefficient (i.e., a cluster cohesiveness metric) for all the data that belongs to cluster "i". The sketch and hash code function (h) are stored, for example in a catalog, along with the trained machine learning model.

At block 604 of FIG. 6, the cloud provided hash code function (h) is applied to the input dataset from time "t" and a compact sketch of the results is computed. In accordance with one or more embodiments of the present invention, cluster heads from the training data's sketch are used as seeds for unsupervised k-means++ clustering of the input dataset to find a solution that is closest to the seed centroids (i.e., the cluster heads from the training data). At block 606, an effectiveness of the trained machine learning model at the edge node is computed based at least in part on the distance between the sketch of the training data and the sketch of the testing data. In accordance with one or more embodiments of the present invention, the distance is computed as a distance between the training data's sketch and the input dataset's sketch (e.g., the sum of $(w_i-w_{i'})^2$ over all i).

At block 608, drifts in data characteristics are tracked by monitoring changes in cluster centroids and/or its silhouette coefficient. To detect drift in data characteristics, the centroids obtained from clustering the input dataset from time "t" are used as the "seed" to cluster the hash codes from the input dataset at time "t+1" (seeding using centroids from a reference data is used to incentivize the clustering algorithm to first search over small variations to the seed centroids). Global changes in data characteristics can be computed using a Wasserstein distance between the distribution to data to old and new centroids. One or more embodiments of the present invention can also be used to drill down into each cluster by examining both the shift in the cluster's centroid and cohesiveness (such as the Silhouette coefficient), and capture drift in data characteristics over time. For instance, even if the centroid did not shift, the cluster's cohesiveness could have decreased, pointing to increased noise in the test data.

At block 610 of FIG. 6, datasets are identified for supervised labeling and re-training based, for example, on data hashed to new clusters and/or data that hashed to clusters that drifted the most (e.g., per shift in cluster centroid or cluster silhouette coefficients). At block 612 of FIG. 6, the trained machine learning model is re-trained and/or customized for a given edge node based on the new training dataset.

In accordance with one or more embodiments of the present invention, blocks 602 and 604 are performed at a cloud node(s) and blocks 604, 606, 608, and 610 are performed at an edge node(s). This reduces bandwidth required to transmit the training data to the edge node(s) and as well as the overhead for supervised data labeling at the cloud node(s).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving, by a processor, an input dataset for training a new machine learning model;
performing, by the processor for each of a plurality of trained machine learning models:
retrieving a hash function and a sketch of a training dataset used to train the trained machine learning model;
computing a sketch of the input dataset based on the hash function and the input dataset; and
computing a distance between the sketch of the training dataset and the sketch of the input dataset;
ranking the plurality of trained machine learning models from smallest computed distance to largest computed distance;
selecting a seed machine learning model for the input dataset from the plurality of machine learning models, the selecting based at least in part on the ranking; and
initiating a training process of the new machine learning model based at least in part on the selecting, the training process based at least in part on the selected seed machine learning model and the input dataset.

2. The computer-implemented method of claim 1, wherein a trained machine learning model ranked as having a smallest computed distance is selected as the seed machine learning model.

3. The computer-implemented method of claim 1, wherein the performing, ranking, selecting and initiating are performed automatically by the processor in response to the receiving.

4. The computer-implemented method of claim 1, wherein the processor comprises an edge node in a distributed computer system.

5. The computer-implemented method of claim 1, wherein the processor comprises a cloud node in a distributed computer system.

6. The computer-implemented method of claim 1, further comprising initiating retraining of the selected seed machine learning model, the re-training based at least in part on a training dataset used to train the selected seed machine learning model and the input dataset.

7. The computer-implemented method of claim 6, wherein the re-training is initiated based at least in part on the distance between the sketch of the training dataset and the sketch of the input dataset being less than a threshold.

8. A system comprising:
a memory having computer readable instructions; and
one or more processors for executing the computer readable instructions, the computer readable instructions controlling the one or more processors to perform operations comprising:
receiving, by a processor, an input dataset for training a new machine learning model;
performing, by the processor, for each of a plurality of trained machine learning models:
retrieving a hash function and a sketch of a training dataset used to train the trained machine learning model;
computing a sketch of the input dataset based on the hash function and the input dataset; and
computing a distance between the sketch of the training dataset and the sketch of the input dataset;
ranking the plurality of trained machine learning models from smallest computed distance to largest computed distance;
selecting a seed machine learning model for the input dataset from the plurality of machine learning models, the selecting based at least in part on the ranking; and
initiating a training process of the new machine learning model based at least in part on the selecting, the training process based at least in part on the selected seed machine learning model and the input dataset.

9. The system of claim 8, wherein a trained machine learning model ranked as having a smallest computed distance is selected as the seed machine learning model.

10. The system of claim 8, wherein the performing, ranking, selecting and initiating are performed automatically by the processor in response to the receiving.

11. The system of claim 8, wherein the processor comprises an edge node in a distributed computer system.

12. The system of claim 8, wherein the processor comprises a cloud node in a distributed computer system.

13. The system of claim 8, wherein the operations further comprise initiating retraining of the selected seed machine learning model, the re-training based at least in part on a training dataset used to train the selected seed machine learning model and the input dataset.

14. The system of claim 13, wherein the re-training is initiating based at least in part on the distance between the sketch of the training dataset and the sketch of the input dataset being less than a threshold.

15. A computer program product comprising a computer readable storage medium having program instructions embodied therewith, the program instructions executable by a processor to cause the processor to perform operations comprising:
receiving, by the processor, an input dataset for training a new machine learning model;
performing, by the processor, for each of a plurality of trained machine learning models:
retrieving a hash function and a sketch of a training dataset used to train the trained machine learning model;
computing a sketch of the input dataset based on the hash function and the input dataset; and
computing a distance between the sketch of the training dataset and the sketch of the input dataset;
ranking the plurality of trained machine learning models from smallest computed distance to largest computed distance;
selecting a seed machine learning model for the input dataset from the plurality of machine learning models, the selecting based at least in part on the ranking; and initiating a training process of the new machine learning model based at least in part on the selecting, the training process based at least in part on the selected seed machine learning model and the input dataset.

16. The computer program product of claim 15, wherein a trained machine learning model ranked as having a smallest computed distance is selected as the seed machine learning model.

17. The computer program product of claim 15, wherein the performing, ranking, selecting and initiating are performed automatically by the processor in response to the receiving.

18. The computer program product of claim 15, wherein the processor comprises an edge node in a distributed computer system.

19. The computer program product of claim 15, wherein the processor comprises a cloud node in a distributed computer system.

20. The computer program product of claim 15, wherein the operations further comprise initiating re-training of the selected seed machine learning model, the retraining based at least in part on a training dataset used to train the selected seed machine learning model and the input dataset.

* * * * *